UNITED STATES PATENT OFFICE

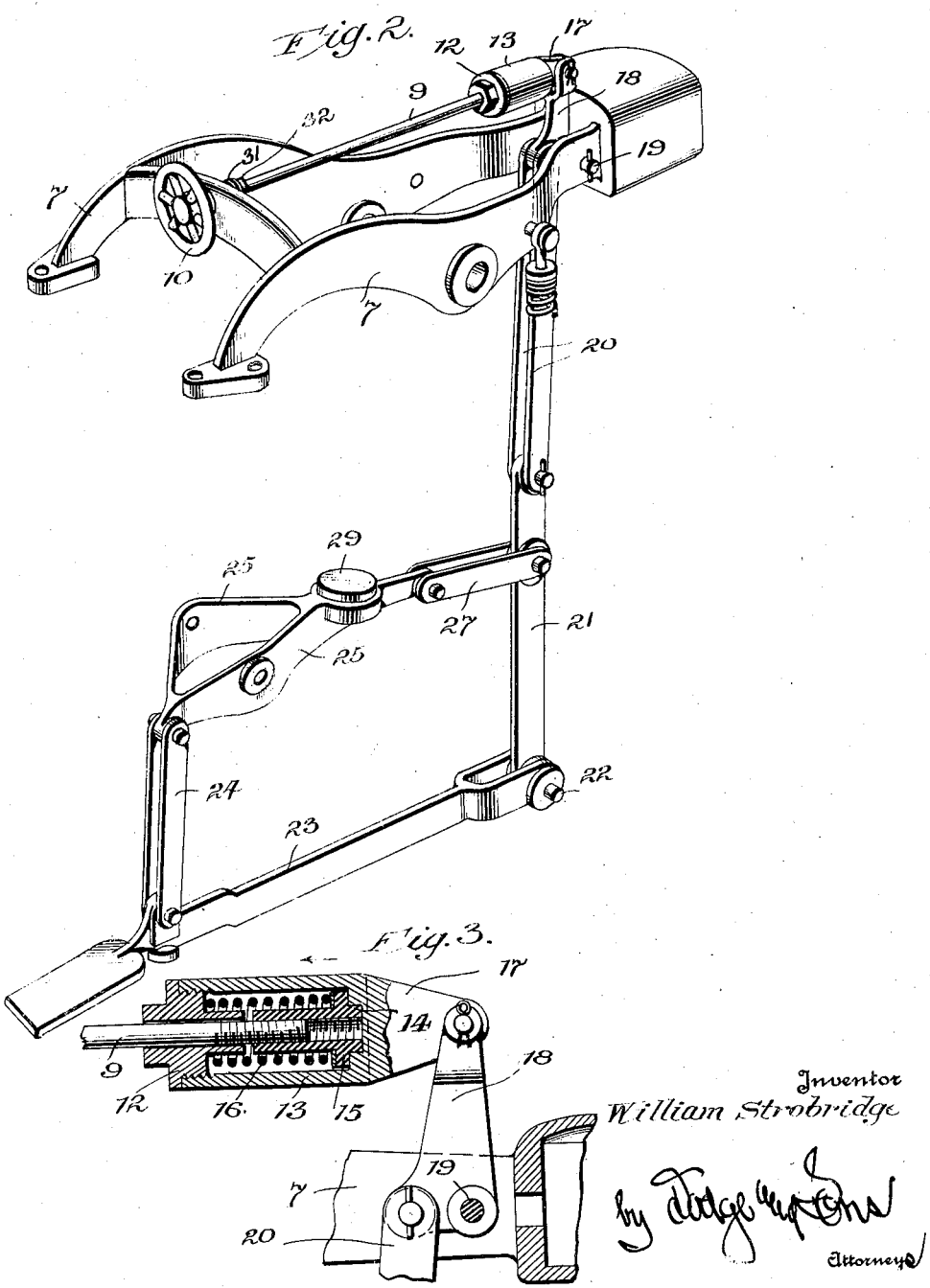

WILLIAM STROBRIDGE, OF SYRACUSE, NEW YORK, ASSIGNOR TO UNITED STATES HOFFMAN MACHINERY CORPORATION, OF NEW YORK, N. Y., A CORPORATION OF DELAWARE

GARMENT PRESS

Application filed August 4, 1930. Serial No. 473,020.

This invention pertains to garment presses and more particularly to that type wherein the head or movable pressing element is carried by one end of a lever or so-called Y-piece.

The main object of the present invention is to provide simple means whereby the degree of pressure exerted by the head upon the goods imposed upon the buck underlying the head may be easily regulated to compensate for different thicknesses of goods while the operator stands in front of the press.

Stated more specifically, the invention has for its object the provision of means, operable from the front of the machine, for regulating the effective action of a toggle mechanism employed to impart the desired pressure, such means being mounted upon and carried by the head-carrying lever.

Figure 1:
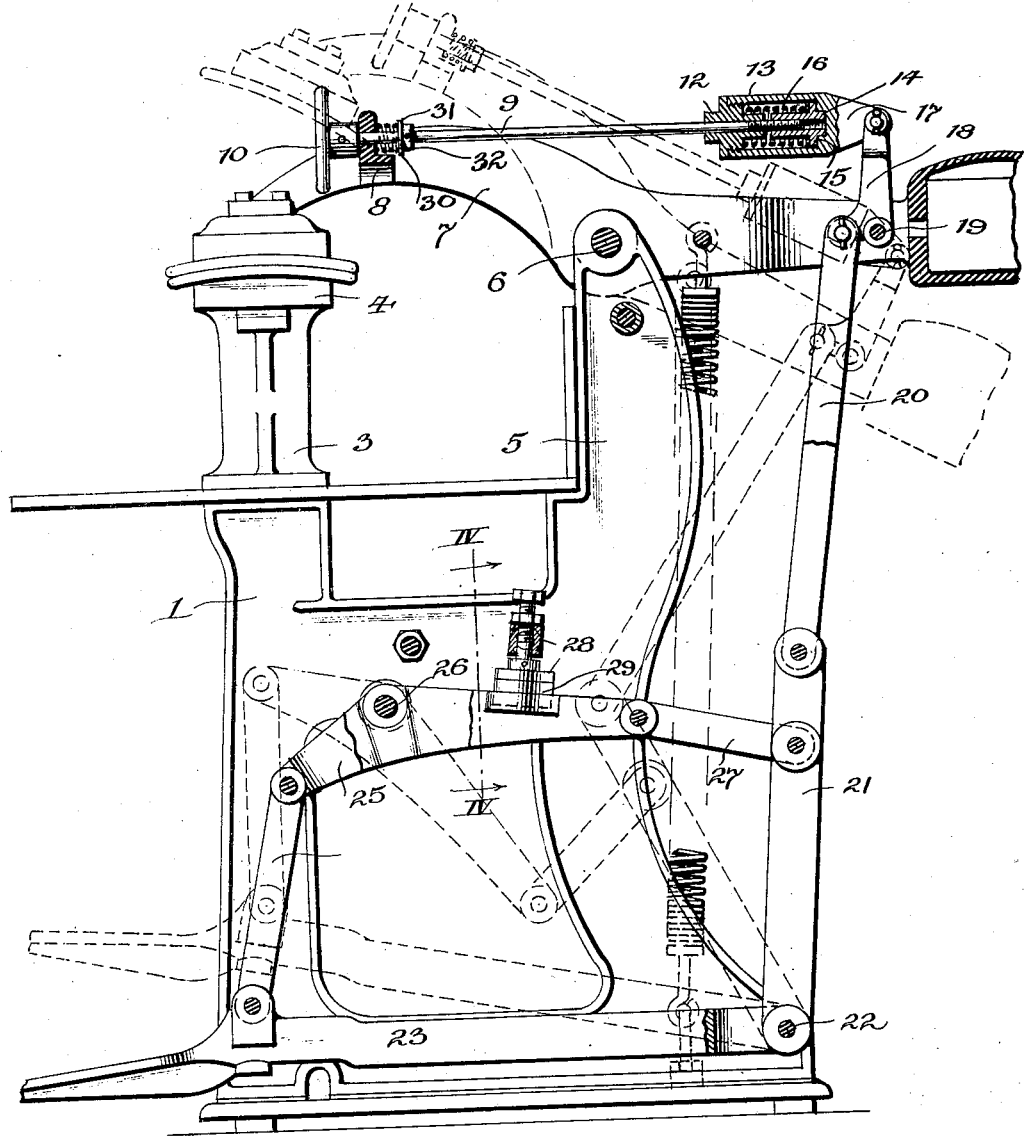
Figure 4:
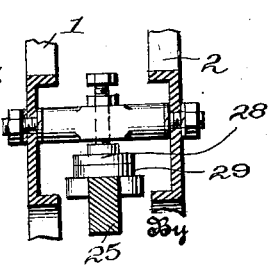

One embodiment of my invention is illustrated in the annexed drawings wherein,

Figure 1 is a vertical sectional view of the machine, one frame member only being shown, Figure 2 a perspective view of the toggle-operating mechanism, the head-carrying lever, and the means employed for adjusting the effective action of the toggle, Figure 3 a detail sectional elevation of the adjusting mechanism and its allied parts; and Figure 4 a transverse vertical sectional view taken on the line IV—IV of Figure 1.

The frame of the machine, as is usual in machines of this type, is composed of two similar elements, as 1 and 2, bolted together to produce the equivalent of a unitary frame. Extending upwardly from the forward portion of the frame is a support 3 upon which is mounted a buck 4. At the rear of the frame each of the members 1 and 2 is provided with an upstanding member as 5, said members being spaced apart and adapted to receive a shaft 6 upon which the lever or Y-piece 7 is fulcrumed. This is all usual practice.

A cross bar 8 connects the forward portion of the members 7 (see Figure 2) and swiveled in the same is a rod 9 provided at its forward end with a hand wheel 10. Surrounding the shaft and bearing against the cross bar 8 is a spring 30 which at its other end takes against a washer 31 held in place with reference to the rod by a collar 32 pinned to the shaft.

At its rear end the shaft 9 is threaded and passes loosely through a nut or cap-piece 12 screwed into the forward end of a cylindrical housing 13. The shaft at this end is threaded and takes into a nut 14 mounted in the cylindrical member and provided with a flange 15 between which and the nut 12 there is mounted a spring 16.

At its rear end the cylindrical member 13 is formed with a lug 17 which is pivotally connected to the upper end of an elbow lever 18. Said lever is fulcrumed upon a shaft 19 which has its bearings in the rear portion of the lever or Y-piece 7. The forwardly extending lower arm of the elbow lever 18 is in turn pivotally connected to the upper end of the link or member 20 of a toggle, the lower member of which is denoted by 21, the latter being pivoted at its lower end to a fixed fulcrum or shaft 22.

A foot operated lever 23 also finds its fulcrum on said shaft, the lever in turn adjacent the foot piece being pivotally connected to a link 24. The latter at its upper end is in turn pivotally connected to a lever 25 fulcrumed on shaft 26. The inward or rear end of said lever is pivotally connected to a link 27 which in turn is pivotally connected to the upper portion of link 21. Link 27 and the adjacent section of lever 25 form in effect a second toggle which, when the lever 23 is depressed, is straightened and in turn straightens the vertical or pressure applying toggle 20—21.

An adjustable stop 28 secured to the frame elements 1 and 2, (see Figure 4) cooperates with a pad 29 carried by lever 25 and acts to limit the movement of the rear portion of said lever in an upwardly direction, and, as a consequence, to limit the movements of the toggles.

Insofar as the present invention is concerned any suitable toggle or pressure applying mechanism may be employed so long as it presents an element of the power train which cooperates with the lower arm of the elbow lever 18.

Through the arrangement above described the operator may secure a predetermination of the maximum available pressure between the pressing members, maintaining, however, at the same time the desired adjustment for variable garment thickness.

This predetermined pressure is effected by compression of the spring 16 through turning the nut 12 in or out. Naturally, this initial compression must be overcome by a force applied to the lower arm of the elbow lever 18 through the toggle link 20.

When pressure is applied through the link 20 it forces the bell-crank 18 to pivot around the shaft 19 and carry the cylindrical housing 13 in a rearward direction. As the nut 14 is fastened to the rod 9, and this in turn is held tight to the cross bar 8, this movement of the housing tends to compress spring 16. By turning the adjusting wheel to the right or left the distance between the pivotal point of the lug 17 and the arm 18 and the cross bar 8 is shortened or lengthened, causing the bell-crank to pivot around the connection between the link 20 and the lower arm of the bell-crank and raise or lower such point, and consequently cause the forward end of the Y-piece, to which the head is attached, to be raised or lowered a corresponding amount, thus compensating for varying thickness of garments.

It is to be noted that the operative parts all lie substantially within a common vertical plane.

What is claimed is:

1. In a garment pressing machine the combination of a main frame; a head-carrying lever fulcrumed thereon; a bell-crank lever pivoted to said head-carrying lever adjacent the rear portion thereof; means for applying pressure to the head, said means being interposed between one arm of the bell-crank lever and a fixed portion of the press; and means connected with the other arm of the bell-crank lever and under the control of the operator for adjusting the angular relation of the bell-crank lever with reference to the head-carrying lever.

2. In a garment press, the combination of a main frame; a head-carrying lever fulcrumed thereon; a bell-crank fulcrumed on the lever to the rear of the lever fulcrum, one arm of said bell-crank extending upwardly in a general vertical direction and the other extending forwardly in a generally horizontal direction; pressure applying means for the head-carrying lever connected to the horizontal arm; and means connected to the vertically extending arm for adjusting the angular position of the bell-crank, said bell-crank and associated parts all lying substantially within a common vertical plane.

3. A garment press as set forth in claim 2, wherein the means for adjusting the bell-crank includes an adjustable compression spring.

4. In a garment press, the combination of a main frame; a head-carrying lever fulcrumed thereon; a bell-crank fulcrumed on the lever at its rear portion, one arm of the bell-crank extending upwardly and the other forwardly; pressure applying means connected to the latter; a housing connected to the upper portion of the upwardly extending bell crank arm; a spring mounted in the housing; a nut closing the outer end of the housing and bearing against the forward end of the spring; a second nut located within the housing and bearing against the rear end of the spring; a threaded rod taking into the last named nut; a fixed element on the head-carrying lever and through which the rod extends; and means for preventing endwise retrograde movement of the rod while still permitting the same to be rotated.

In testimony whereof I have signed my name to this specification.

WILLIAM STROBRIDGE.